United States Patent [19]

Mayer

[11] 4,287,545

[45] Sep. 1, 1981

[54] DIFFERENTIAL TRANSFORMER

[76] Inventor: Ferdy Mayer, 18 rue Thiers, 38000 Grenoble, France

[21] Appl. No.: 45,867

[22] Filed: Jun. 6, 1979

[30] Foreign Application Priority Data

Jun. 8, 1978 [FR] France ............................... 78 17113

[51] Int. Cl.³ ........................ H02H 3/26; H01F 40/06

[52] U.S. Cl. ........................................ 361/44; 336/61; 336/174; 336/223; 361/45

[58] Field of Search ............... 336/173, 174, 175, 222, 336/225, 223, 98, 229, 61; 361/44, 45, 46

[56] References Cited

U.S. PATENT DOCUMENTS

| | | | |
|---|---|---|---|
| 687,141 | 11/1901 | Everest | 336/174 |
| 1,022,880 | 4/1912 | Schmidt | 336/174 |
| 1,986,884 | 1/1935 | Fassler | 336/174 X |
| 2,883,603 | 4/1959 | Dortort | 336/174 X |
| 3,031,736 | 5/1962 | Madden | 336/175 X |
| 3,716,806 | 2/1973 | Zelenz | 336/174 X |
| 3,725,741 | 4/1973 | Misencik | 336/174 X |
| 4,021,729 | 5/1977 | Hudson, Jr. | 336/175 X |
| 4,092,607 | 5/1978 | Robins | 336/174 X |

FOREIGN PATENT DOCUMENTS

| | | | |
|---|---|---|---|
| 7429 | 3/1956 | Fed. Rep. of Germany | 336/174 |

*Primary Examiner*—Thomas J. Kozma

*Attorney, Agent, or Firm*—Oblon, Fisher, Spivak, McClelland & Maier

[57] ABSTRACT

For optimizing the manufacturing cost of the magnetic torus of a differential transformer, the volume is reduced in that the free volume of the central aperture is fully filled: only one turn for each primary conductor, the section of which is reduced, the adjacent parts of larger section forming heat sinks, the central part of the conductors having the form of circular sectors. An important saving is secured on the most expensive part of the relay.

6 Claims, 10 Drawing Figures

DIFFERENTIAL TRANSFORMER

BACKGROUND OF THE INVENTION

The invention relates to a device for protecting individually from electrocution and more specifically to a differential transformer which delivers a trigerring current when a current difference occurs between two phases of a multiphase distribution mains.

The invention has for its object a reduction in cost of such devices. One of the expensive parts is the magnetic torus forming the armature of the differential transformer, and the object of the invention is to provide a differential transformer of reduced volume, and consequently of lower cost.

The working method of such a device is well known. FIG. 1 of the appended drawings is a schematic representation of a differential transformer used in a monophase circuit. Phase conductors 1, 2 of input main E are coupled to a useful load R, and include coils 3 and 4, having the same number of turns, but in opposite directions, so that the fields of these coils in torus 5 are equal and opposite. Consequently, there is no current induced in the secondary coil 6. If conductor 1 happens to have a failure to earth, eg. somebody is in touch at 8 with conductor 1, which provides a connection to earth in 9 with an equivalent resistor $\rho$, currents passing in coils 3 and 4 are no longer equal and a voltage arises in the secondary coil 6. Then a current passes through the secondary circuit, and this current is used to cause the operation of a relay, triggering a safety or protective device, such as a circuit breaker. For the safety of human beings, for the protection of individuals from electrocution it has been settled that the extra current to earth should not rise above 30 mA. This value represents the difference between the currents passing through conductors 1 and 2 and should give rise to a current in the secondary coil sufficient for allowing the direct triggering of a sensitive actuator, such as the one disclosed in French Patent No. 75 34654 (Publication No. 2 331 877) or eventually, in addition with storage or amplifying means, such as those described in French Patents Nos. 1,323,673, 1,347,117 and 1,411,747.

For designing such a device, the first point to be considered is the threshold primary differential current, i.e. the 30 mA cited in the above example, or 450 mA, value frequently used for the safety of installations, or 6 mA, limit value used for the safety relating to electrocution in the United States. It can be understood that the operation of the magnetic torus is finally determined by the number of Ampere-turns per length of magnetic circuit. That is to say for a given torus, determined by the product of this limit differential current per the number of turns of each primary coil. This product should be so much greater than the torus is more magnetized, since it has to deliver a power as high as possible.

Other independent factors are the number of phases of the mains (two in the example of FIG. 1, three for a triphase distribution, and four for a triphase distribution with neutral), the phase nominal current defining the maximum temperature rise of the coils (3 and 4 on FIG. 1) and then of torus 5, the maximum phase short-circuit current, defining the strength of the conductors, regarding fusibility.

The resistance of coils 3 and 4 gives rise to a Joule effect. The resulting heating should not be too high, since the heating, for a given nominal phase current, is directly proportional to the number of turns of each primary phase.

A first discrepancy now appears: for the proper operation of the magnetic torus, the number of primary turns should be as high as possible, but unfortunately, that causes too many Joule effect losses.

Further, this number of turns, with as large a section area as possible to obtain a low resistance is desired, is to be passed in the central aperture of torus. There appears a second discrepancy: the torus should have a larger diameter, which reduces the magnetization, since the magnetic circuit is longer.

STATEMENT OF THE INVENTION

One object of the present invention is to provide an optimum solution amongst the above inconsistent relations, in order to cause minimum Joule effect losses, due to the phase nominal current.

Another object of the present invention is to provide a magnetic torus with dimensions reduced to a minimum: the saving in volume can be important in view of the volumes allowable nowadays for circuit-breakers, for example.

Another object of the present invention is to provide a differential transformer with a reduced number of primary turns having a section area reduced to a minimum. The saving in manufacturing cost can be critical for mass production, due to the possibilities of manufacturing by means of automatic machines, for example.

According to a feature of the invention, each of the primary coils comprise only one turn (monoturn). In a practical realization, such a coil comprises only the portion of the conductor (3, 4) which extends through the torus.

Finally, the object of the present invention is to provide, through the choice of a magnetic torus of minimum dimensions (minitorus) a saving in the cost of its manufacture, in view of an optimum global cost.

According to another feature of the invention, the one turn primary conductors fill up substantially the aperture of the torus, wherein each conductor has a section of geometrical form adapted to the inner surface of the torus, so as to increase the maximum filling up of available volume.

According to another feature of the invention, the one turn primary conductors present a reduced section in the portion inside the torus, for so localizing the Joule losses; the larger adjacent portions on either sides of the torus working as heat sink.

Various other objects, features and attendant advantages of the present invention will be more fully appreciated as the same becomes better understood from the following detailed description of the present invention when considered in connection with the accompanying drawings.

DESCRIPTION OF THE PREFERRED EMBODIMENT

Figure 1:
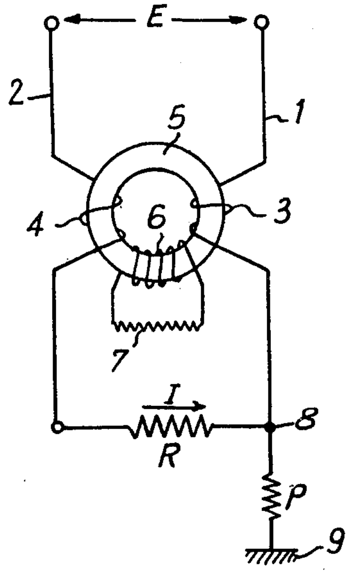
FIG. 1 is a schematic working diagram of a differential transformer.
Figure 2:
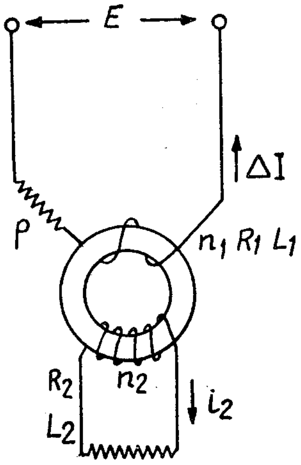
FIG. 2 is an equivalent diagram, in the case of a failure to earth.

Referring now to FIG. 1, coils 3 and 4 have each $n_1$ turns, a resistance $R_1$ and a self-inductance $L_1$. The secondary coil 6 has $n_2$ turns, a resistance $R_2$ and a self-inductance $L_2$. The mutual inductance is M. Practically, the resistance $\rho$, equivalent to the failure to earth is great with respect to $R_1$ and $L_1\omega$. It is so possible to draw the equivalent circuit shown on FIG. 2. The differential current $\Delta I \simeq E/\rho$, E being the input main voltage.

$$\text{secondary current } i_2 = -j\frac{M\,\omega\,\Delta I}{R_2 + j\,L_2\omega}$$

and the secondary voltage $U_2 = R_2 i_2$

The difference between the Ampere-turns resulting from excitation $\overrightarrow{n_1\Delta I}$ and the demagnetizing Ampere-turns from load $\overrightarrow{n_2 i_2}$ provides the magnetization and the resulting flux in the torus. The torus effective permeability (working point determined by this magnetization) determines the values of M and $L_2$.

The self-inductance L of a coil on a torus is given by $$L = \frac{\mu\,S}{l_{moy}}\,1.25 \cdot n^2 \cdot 10^{-8}$$

where n is the number of turns, $\mu$ the effective permeability such as above defined, $l_{moy}$ the average length of the magnetic circuit in cm, i.e. $(\pi/2)(\phi_1+\phi_2)$, if $\phi_1$ and $\phi_2$ are the inner and outer diameter of the torus, S the section area of torus in cm$^2$, i.e. $(h/2)(\phi_2-\phi_1)$ if h is the height of torus. For the draft of FIG. 2, it ensures:

$$L_1 = \frac{\mu\,S}{l_{moy}} \cdot 1.25 \cdot n_1^2 \cdot 10^{-8}$$

$$L_2 = \frac{\mu\,S}{l_{moy}} \cdot 1.25 \cdot n_2^2 \cdot 10^{-8}$$

and $$M = \sqrt{L_1 L_2} = \frac{\mu\,S}{l_{moy}} \cdot 1.25 \cdot n_1 \cdot n_2 \cdot 10^{-8}$$

Replacing these values in the above equation, $$|i_2| = \frac{\frac{S}{l_{moy}}\,1.25 \cdot n_1 \cdot n_2 \cdot 10^{-8} \cdot \omega \cdot \Delta I}{\sqrt{R_2^2 + \frac{\mu^2 S_2^2}{l_{moy}^2} \cdot 1.56 \cdot n_2^4 \cdot 10^{-16} \cdot \omega^2}}$$

neglecting the secondary coil resistance with respect to the load resistance 7, we obtain:

$$|u_2| = R_2|i_2| \cong \frac{\mu\,S}{l_{moy}} \cdot 1.25 \cdot n_2 \cdot 10^{-8} \cdot \omega \cdot \sqrt{n_1^2(\Delta I)^2 - n_2^2 i_2^2}$$

or, as a function of torus volume $V \simeq S \cdot l_{moy}$ $$|u_2| \cong \mu\frac{V}{l_{moy}^2}\,1.25 \cdot n_2 \cdot 10^{-8} \cdot \omega\sqrt{n_1^2(\Delta I)^2 - n_2^2 i_2^2}$$

Then, for a given differential current:

the secondary voltage with no load ($i_2=0$) is proportional to the torus permeability, torus section area, primary turns number and secondary turns number. It is in inverse ratio to the torus diameter.

The voltage under load falls with respect to the voltage with no load and it is no longer proportional to $n_1$ and $n_2$: this represents an "inner impedance".

The product $P = R \perp i_2 \perp^2$ represents the secondary power available: it passes through a maximum for an "adapted" load (resistances are equal, selfic effects are balanced).

The description of a typical magnetic torus for the direct control of a triggering relay is given below: with a "Hyperm" material (Krupp), a torus with inner diameter $\phi_1=24$ mm, outer diameter $\phi_2=38$ mm and height h=15 mm has been fitted with a primary coil of $n_1=5$ turns and a secondary coil of $n_2=1400$ turns.

Figure 4:
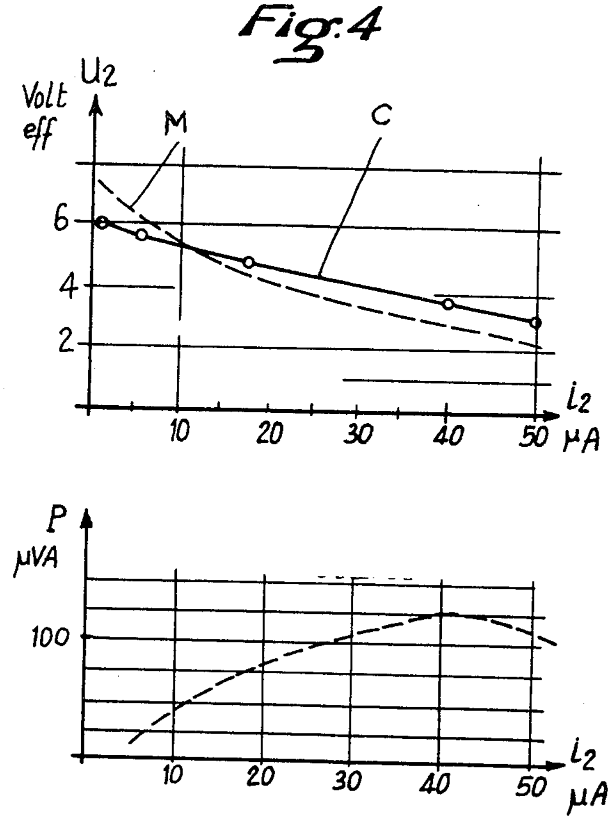
FIGS. 4 and 5 are graphs representing in the upper part the secondary voltage in volts as a function of secondary current in milliamps, and lower, the secondary power in millivoltamperes, for two different torus.

The upper part of FIG. 4 shows a graph giving the secondary voltage $u_2$ as a function of current $i_2$, computed (curve C) and measured (curve M). The lower graph shows the measured power, passing through a maximum of about 120 $\mu$VA for a load R of about 67 K$\Omega$, with $i_2$ slightly above 40 $\mu$A (for $\Delta I=20$ mA).

The above described torus is typical for realizing directly the direct control of a releasing relay which may be triggered with A.C. with a power ranging about this value.

The above torus has an inner diameter of 24 mm, i.e. an available total section area of 452 mm$^2$ for the 10 or 15 or 20 primary turns (monophase, triphase or triphase with neutral) and the secondary coil. Consequently, if about a quarter of the section area is filled by the primary turns, there is available for each conductor 11.3—7.53—5.65 mm$^2$. One can see easily about which magnitude the nominal phase current capacity is ranging. If a current density of 6 A/mm$^2$ is desired, the capacity will be 67.8—45.2—33.9 A.

The same torus with a secondary coil of 140 turns would provide the same power under a current ten times greater and a voltage equal to the tenth, with an internal resistance one hundred times lower. That would be a typical realization for direct triggering of a releasing relay.

In the above computation, a current density of 6 A/mm$^2$ has been admitted, with a corresponding maximum phase current of 68, 45 and 34 A, in the assumption that the primary conductor has a constant section. Theoretically, the five active turns of each phase correspond to about four and a half "heating" turns, since it is not necessary that the last turn be complete, and according to a feature of the invention, the conductor can be thicker at both ends of the coil.

This difference between the portion of the turns which excite the magnetic circuit and those which necessarily generate heat (passing through the aperture of the torus) is fundamental.

Figure 6:
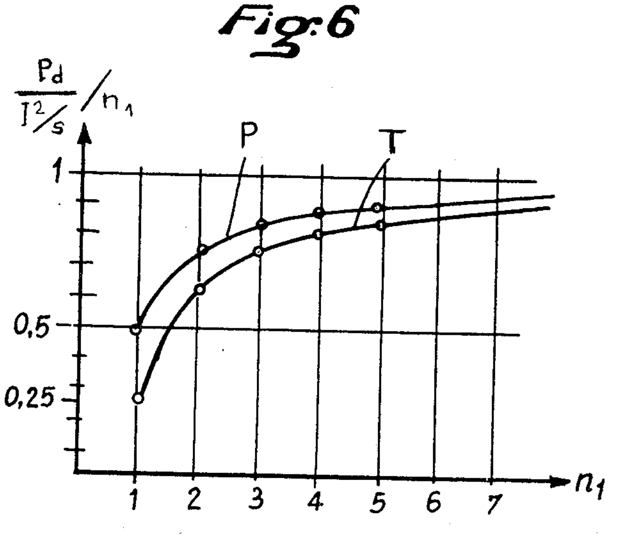
FIG. 6 is a graph representing the specific heating of a differential transformer as a function of the turn number of a primary coil.

FIG. 6 represents a graph showing the specific electric power dissipated in each turn (for a given current and a given section) i.e. also the increase of temperature as a function of the active turns number $n_1$. The curve T gives the theoretical values and the curve P the practical values as measured. For $n_1$ high, the number of active turns and the number of heating turns tends to be the same. For $n_1=3$, the ratio which is obtainable in practice is 0.83, for $n_1=2$, it is 0.75 and for $n_1=1$, the ratio specially advantageous is 0.5. Consequently, only one active turn can be provided, so that the dissipation of only half a turn is caused. As only the passage of the wire in the torus aperture counts, this portion of wire can be directly followed by more important masses, heating not much, further working as thermal mass for dissipating the heat.

In replacing a five active turns primary coil ($4\frac{1}{2}$ thermal) by one active turn, equivalent to half a "thermal" turn, it is theoretically possible to increase the power dissipated in each turn, in a ratio $4\frac{1}{2}:\frac{1}{2}=9$, i.e. for a given section, multiply the current by $\sqrt{9}=3$, or for a given current, reduce the copper section in a ratio of 9.

Then, the whole section area to be passed in the torus aperture is first divided in the ratio 5:1 (number of turns), afterwards 3 (the same total dissipation). The whole section can then be reduced in the ratio 15, and consequently the inner torus diameter in the ratio $\sqrt{15}\simeq3.9$. (Practically the reduction is not so important due to the secondary coil, and due to the greater proportion of the space lost for the isolation).

According to this method, there is provided one active turn and maximum primary current increasing conditions. This leads to a "minimum" torus for which new magnetization conditions are now to be computed, since these determine the effective permeability: it is certain that the saving on the length of magnetic circuit $1_{moy}$ will not compensate in fact the reduction of excitation, i.e. the reduction of the turns number. Besides, it is evident that such a torus will provide a reduced power, for the same reasons.

Figure 3:
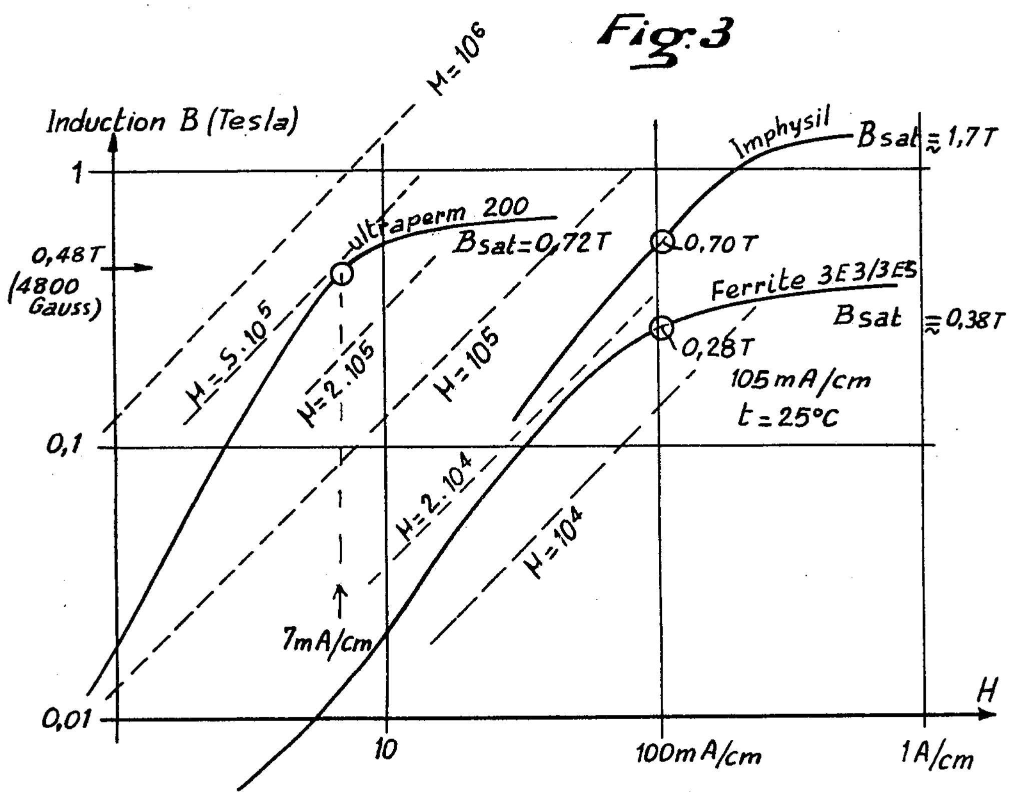
FIG. 3 is a graph representing for several materials the magnetic permeability curve, giving for each material the induction as a function of field.

Such a torus was made with a new alloy: Ultraperm 200 (produced by the firm Vacuumschmelze) having a permeability higher than 200,000 for an induction of 4,800 Gauss, for an excitation of 7 mA turn/cm, not far from the saturation induction (7,800 Gauss) (FIG. 3). From the above consideration, the outer diameter was 18 mm, inner diameter 9 mm, height 5 mm, with an average flux circuit length of 42,4 mm, reaching the above magnetization with a differential current of 30 mA.

Figure 5:
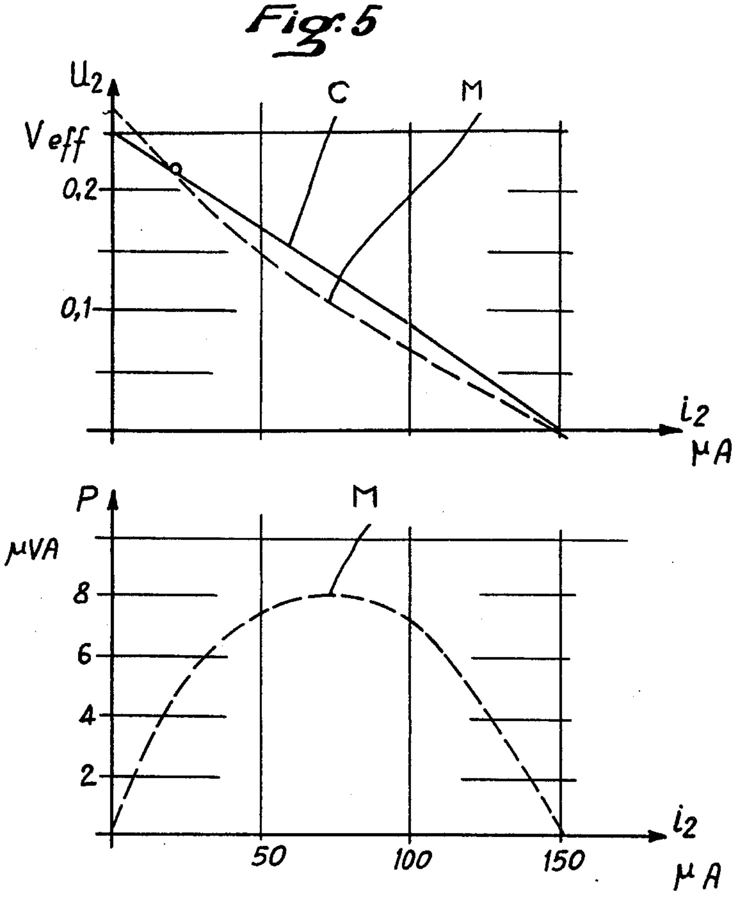

The graph of FIG. 5 shows the voltage computed (curve C) and measured experimentally (curve M) between the terminals of a 200 turns coil, for a 30 mA differential current (voltage measured with a full wave rectifier, calibrated in effective values). The maximum useful power is in the range of 8 $\mu$VA, in this case, i.e. 1/15 only of the preceding torus: This power is not sufficient for controlling directly a sensitive relay. Besides, it is sufficient without problem for controlling a storage amplifier device, such as mentioned above.

It is evident with such a minitorus, that voltage $u_2$ decreases for a given number of secondary turns: this little torus so yields, for $n_2=1400$ turns, 1.89 V (instead of 7.4 V for the big one) and requires then a higher number of secondary turns (which can be easily done with a multiply wire, such as "Bifilrex" series connected after winding, which provides another protecting advantage for the high differential current, due to the spread capacity, which is more important) or voltage multiplicating rectifiers, or an overvoltage multiplier.

It is evident that the inner impedance increase of the source increases correspondingly. The "heating half-turn" concept, in combination with the optimum use of the free section in the torus aperture provides practical realizations, directly from the above description.

Figure 7:
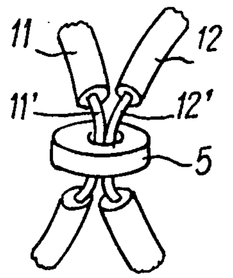
FIG. 7 is a perspective view representing schematically a feature of the invention.
Figure 8:
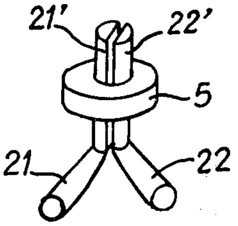
FIG. 8 is a perspective view representing schematically another feature of the invention.
Figure 9:
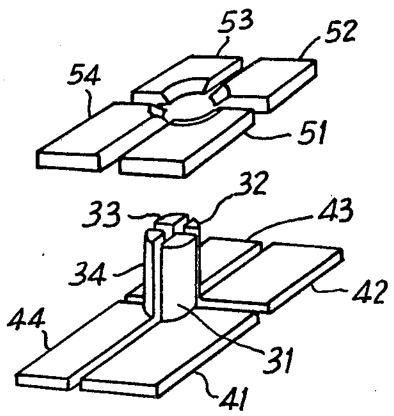
FIG. 9 is a perspective view, representing an embodiment of the invention.

Various embodiments of the invention are shown in FIGS. 7, 8 and 9.

In FIG. 7, the primary conductors (monophase) 11 and 12 passing through the torus aperture present over a short length thinner portions 11' and 12'. The thinner portions have a section area as large as possible, allowing both conductors to be passed in the free space remaining in the torus center. The assembling with thick portions 11 and 12 being made evidently after the threading operation. The heat generated in this reduced section is transferred towards the adjacent portions of larger section, the large surfaces of which are working as radiators for the removal of this heat and so avoid an inadmissible temperature rise.

In FIG. 8, both conductors 21 and 22 have the same section area over their whole length, but the portion 21', 22' of each, in the torus center is formed differently so as to fill up completely the free space in the aperture. The device is shown as comprising two conductors (monophase) having a section substantially semicircular, with only an insulating leaf between them.

It is evidently possible to combine these two principles. FIG. 9 shows a practical embodiment of the invention, taking advantage of the features of the embodiments of FIGS. 7 and 8, in the case of a three phase circuit with neutral. In the inner part of the torus 5, not shown, the four conductors 31, 32, 33, 34 have equal section areas, substantially in form of a quarter or circle, separated by insulating leaves. The conductors 31, 32, 33, 34 have a length slightly greater than the axial height of the torus, and each conductor is welded to a plane conductor 41, 42, 43, 44 at least at one end, and preferably another plane conductor 51, 52, 53, 54 at the other end. The free space in the torus aperture is so filled up to the maximum and the conductors which cross it through have a reduced section on the portion corresponding to the height of the torus. The heat generated in the rectilinear segments 31, 32, 33, 34 is transferred to the plates 41, 42, 43, 44 and 51, 52, 53, 54 which scatter it, which keeps the temperature at an allowable level. The invention so provides a torus of minimum dimension while having a sufficient conducting section with a reduced temperature rise. The allowable temperature rise determines the section of conductors 31, 32, 33, 34 and the above computation allow the determination of the torus dimensions. It is thus possible to have a substantial cost reduction.

As a practical example, for an inner torus diameter of 9 mm, it is possible to have a useful aperture of 8 mm diameter, with a special form of its protecting frame. If the secondary coil fills up one third of its free area, the diameter D for the primary coil with a segmented section is about 6.53 mm, i.e. 8 $mm^2$ for each phase (in the most unfavourable case of three phases and neutral).

With a current density three times greater than 6 $A/mm^2$ (cf. supra), it is 18 $A/mm^2$, and $18\times8=144$ A for each nominal phase current, i.e. a nominal current clearly higher than the above five turns torus, with the same total dissipation.

Figure 10:
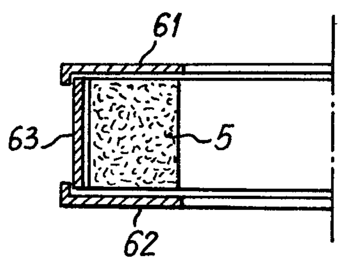
FIG. 10 is a sectional view of a torus with a casing according to the invention in a plane comprising the axis of the torus.

In the case of a torus in a material of high permeability, with which an outer protecting casing is necessary, it is possible to increase to a maximum the passage available for the conductors in the torus central aperture, i.e. for the same passage, to reduce the torus volume, in employing according to a feature of the invention a casing without central wall, such as shown on FIG. 10. Such a casing comprises two plane covers 61 and 62 of general annular form, and a cylindrical side wall 63. These parts can be united by any suitable means, such as adhesive or even merely juxtaposed. One of the plane covers may be integral with the cylindrical sidewall. The advantage is the lack of a central inner sidewall, allowing to spare a corresponding thickness, and to dispose the secondary coil nearly in contact with the torus. The cylindrical sidewall 63 may be metallic, without obstructing the coil insulation, or the three parts 61, 62, 63 may be metallic (with a wire having a good insulation) since the lack of inner cylindrical sidewall avoids the formation of a short-circuited turn. Such devices, according to the invention are specially advantageous due to the mechanical rigidity which is so obtained, and the high permeability torus is well protected.

Such a casing may be omitted with certain magnetic materials, insulating and mechanical resistant, as described below.

The following examples provide a typical comparison for a conventional differential relay:

$n_1=5$ turns $\phi_1=24$ mm $\phi_2=38$ mm $h=15$ mm, i.e. a volume $(h/2)(\phi_2-\phi_1)(\pi/2)(\phi_1+\phi_2)=10.22$ cm$^3$ yielding a maximum power of about 120 $\mu$VA, and for a realization according to the invention, of a minitorus-monoturn, in a magnetic alloy having a slightly higher permeability:

$n_1=1$ turn $\phi_1=9$ mm $\phi_2=18$ mm $h=5$ mm, i.e. a volume $(h/2)(\phi_2-\phi_1)(\pi/2)(\phi_1+\phi_2)=0.954$ cm$^3$ yielding a maximum power of about 8 $\mu$VA.

The mass of magnetic material is divided by about 10.7 (with a corresponding reduction in cost). The copper wire length of the primary coil is divided by ten, and similarly for the heat generation. To that is to be added the saving of material and the savings in the practical manual manufacture of such primary circuits.

As a magnetic disconnecting or triggering device necessarily more sensitive (i.e. employing a direct or storage amplification) is clearly cheaper than the sparing obtained, the invention provides a good solution for the optimized realization of the differential function.

For a good understanding of the generality of the advantage of the minitorus-monoturn solution, the case of the nominal differential current of 450 mA and of 6 mA mentioned in the beginning of this specification should be considered, beginning with the torus diameters as fundamental data: practically, according to the invention, the torus useful inner diameter is essentially determined by the number of phases and the nominal current capacity. (In the example, it has been observed that the overload current in fusible does not interfere with the chosen current densities).

For designing a torus adapted to deliver a differential current of 450 mA, the permeability should be correspondingly lower, on the one hand for having given a secondary voltage and power (see above equation), and on the other hand for defining a good magnetic working point. A torus having the same dimensions as the above described minitorus has for its circuit an average length of 42.4 mm, what corresponds to an excitation of $450/42.4\simeq105$ mA.turn/cm.

The graph of FIG. 3 shows that an inexpensive conventional directional alloy Fe-Si provides an induction without load of 7000 Gauss, and is perfectly suitable; even a ferrite torus 3E3 or 3E5 (Phillips) or something equivalent allows to provide an utilizable induction of 2800 Gauss.

The application of this latter solution (with the above described amplification) is particularly of advantage, since the low induction loss can be compensated by the lack of a casing for the torus coil, which is an interesting industrial solution.

The realization of a torus for a 6 mA differential current is then to be considered with the monoturn principle of the invention with the magnetic alloys presently available (such as Ultraperm 200, FIG. 3). As the monophase mains is essentially concerned, in this case, with the same heat generation and with the same section free for the secondary coil, the inner diameter of the torus can be reduced from 9 to 7.35 mm. Keeping the same ratio $\phi_2/\phi_1$ (which cannot be increased in view of working in proper magnetic conditions), a magnetic working point is defined at about 1.73 mm A.turn/cm at the verge of the possible. In increasing the torus height h of about 5 to 20 mm, the same useful power as in the case of the example of 30 mA differential current is obtained again (i.e. using the same amplification). With the same initial height of 5 mm, the amplification has to provide an additional power increase of about 4. The corresponding sensibility of 2 $\mu$VA is easily realizable with the present technology of manufacturing of these amplifications.

I claim:

1. A differential current transformer for an electrical installation protecting device, comprising:

a magnetic torus with at least two primary coils having the same number of turns, said magnetic torus including high permeability material, said primary coils being traversed by opposed mains currents, said magnetic torus further including a secondary coil;

wherein each of said primary coils includes one turn;

wherein each of said two primary coils has a thinner section in a portion of each of said coils located in a central aperture of said torus and each of said primary coils includes a larger section in portions adjacent to said thinner section; and wherein said larger sections of each of said primary coils form thermal masses in view of increasing the dissipation of heat generated in the thinner portion.

2. Transformer according to claim 1, characterized in that the portion of each conductor located inside the torus has a geometrical form adapted to the torus inner surface, for filling up better the free volume.

3. Transformer according to claim 2, characterized in that each primary conductor is formed by an intermediary cylindrical part having a form of a circular sector, disposed between two plane parts, perpendicular to the cylindrical part, one on each plane torus face.

4. Transformer according to claim 2, characterized in that the torus is protected by a casing, on the plane faces, around the outer cylindrical face, but having no protection on the inner cylindrical face.

5. Transformer according to claim 2, characterized in that the torus is formed with a material resistant and little sensitive to mechanical strains, the surface of which forming an electrical insulator, allowing the direct passage of the conductor turns without casing, more especially for the secondary coil.

6. Transformer according to claim 2, characterized in that it comprises a complete filling of the torus inner free passage left by the secondary coil thereon, said secondary coil being formed from an insulated multiple ply wire wound about said torus, each of said multiple plies in said multiple ply wire being a very thin conductor, said multiple plies being connected in series after said multiple ply wire has been wound about said torus, said secondary coil supplying a voltage signal to a triggering device.

* * * * *